United States Patent
Kubat et al.

[11] Patent Number: 5,471,921
[45] Date of Patent: Dec. 5, 1995

[54] APPARATUS FOR DEWATERING AND LOSSENING RAW BIOPULP

[76] Inventors: Josef Kubat, Solparksvagen 3, S-171 35 Solna; Jan Abom, Poppelgatan 12, S-421 74 V. Frolunda; Carl Klason, Hjalmared 2201, S-441 95 Alingsas; Frederik von Bulsingslowen, Femkampsgatan 7B, S-416 59 Goteborg, all of Sweden

[21] Appl. No.: 98,291

[22] PCT Filed: Dec. 27, 1991

[86] PCT No.: PCT/SE91/00910

§ 371 Date: Nov. 29, 1993

§ 102(e) Date: Nov. 29, 1993

[87] PCT Pub. No.: WO92/13709

PCT Pub. Date: Aug. 20, 1992

[30] Foreign Application Priority Data

Feb. 4, 1991 [SE] Sweden ................................ 9100339

[51] Int. Cl.⁶ .................................................. B30B 9/02
[52] U.S. Cl. ........................ 100/90; 100/106; 100/121; 100/126; 100/169; 100/173
[58] Field of Search ........................... 100/90, 106, 121, 100/126, 138, 139, 168, 169, 173, 192

[56] References Cited

U.S. PATENT DOCUMENTS

| | | | |
|---|---|---|---|
| 1,748,374 | 2/1930 | Winger | 100/139 |
| 1,929,129 | 10/1933 | Villez | 100/139 |
| 2,265,749 | 12/1941 | Stevens | 100/169 |
| 2,858,747 | 11/1958 | Wagner | 100/106 |
| 3,114,930 | 12/1963 | Oldham et al. | 100/90 |
| 3,288,293 | 11/1966 | Essel | 100/126 |
| 3,465,555 | 9/1969 | Arendt | 100/90 |
| 4,154,161 | 5/1979 | Fisher et al. | 100/121 |
| 4,558,725 | 12/1985 | Veneziale | 100/121 |
| 4,559,376 | 12/1985 | Kubat et al. | 524/13 |
| 4,797,135 | 1/1989 | Kubat et al. | 44/500 |

FOREIGN PATENT DOCUMENTS

| | | | |
|---|---|---|---|
| 2456611 | 12/1980 | France. | |
| 62-137198 | 6/1987 | Japan | 100/121 |
| 42215 | 9/1912 | Sweden. | |
| 52787 | 7/1919 | Sweden. | |
| 90/13706 | 11/1990 | WIPO. | |

*Primary Examiner*—Stephen F. Gerrity
*Attorney, Agent, or Firm*—Browdy and Neimark

[57] ABSTRACT

An apparatus for production of dewatered and loosened biopulp, wherein precrushed raw biopulp is press fed by pistons (2) against a pair of counter-rotating press rolls (4, 5) between which the biopulp is dewatered. The pulp is then fed into a backpressure vessel (7) maintained at an overpressure, which prevents water from entering the backpressure vessel and remoistening the biopulp. The biopulp leaves the backpressure vessel through an air-tight compartment feeder (9) constructed like a revolving door. The press rolls include one of solid metal (5) and another (4) with a number of elastically mounted plates which can move radially in response to a radial load.

3 Claims, 2 Drawing Sheets

APPARATUS FOR DEWATERING AND LOSSENING RAW BIOPULP

FIELD OF THE INVENTION

The present invention concerns a method and an apparatus for dewatering and loosening raw biopulp using roll dewatering. The invention concerns in particular a method and an apparatus for dewatering and loosening chipped and precrushed raw wood using roll dewatering. The invention is of especial interest in connection with the production of powdered fuel, but also e.g. in connection with the production of fillers for plastics and the production of paper pulp.

DESCRIPTION OF THE PRIOR ART

Plants in general contain 50–90 weight percent water and energy forests (for example sallow or poplar) contain 70 weight percent. Raw wood consists in principle of water filled cells.

A technical field in which dewatering of raw biopulp is practiced on a large scale is pressing of sugar cane. Here the raw biopulp must pass at least twelve pairs of rolls before effective dewatering can be obtained. In such a treatment of sugar cane the intention is to make use of the liquid that is pressed out, while for the dewatering procedure according to the present invention the desired product is the dewatered material itself.

A method of removing water from wood is to use a bark press but the only result is that the water outside the wood is removed.

SUMMARY OF THE INVENTION

The present invention concerns a method for production of dewatered and loosened biopulp, which method is characterized in that precrushed raw biopulp is pressed against a pair of counter-rolling press rolls between which the biopulp is subjected to a pressure between 500 and 1000 bars. Hereby the biopulp is dewatered and then fed into a backpressure vessel which is maintained at an overpressure of at least 1 bar. This causes air to blow out through the nip between the rolls, thus preventing the water pressed out from entering the backpressure vessel and avoiding remoistening of the dewatered biopulp. The dewatered and loosened biopulp is then transferred from the backpressure vessel and subjected to well-known chemical and mechanical treatments, for instance for production of powdered fuel, fillers for plastics or pulp for paper production.

The invention also concerns an apparatus for dewatering and loosening the raw biopulp, which apparatus is characterized by including a system of feeding pistons for pressing the biopulp against two profiled press rolls one of which is made of solid metal and the other, in a width corresponding to that of the solid roll, is composed of a number of elastically mounted plates which can move radially in response to radial loads. On the exit side of the press rolls is a backpressure vessel at overpressure and a compartment feeder for transferring the biopulp from the backpressure vessel.

With the method and apparatus according to the invention the wood, in the form of chips which have been precrushed to a size of approximately 2–5 mm, is subjected to large press or compressive forces, whereby the water pressure in the cells is increased so much that they break, water is pressed out and the water content is reduced from about 70 to 35 weight percent. The water pressed out thus produces a number of canals and cracks in the compressed wood structure and when the roll pressure ends the partially dewatered raw wood is loosened through its elasticity. By use of this treatment exceptionally favorable preconditions for an effective continued process treatment of the dewatered and loosened material are achieved.

BRIEF DESCRIPTION OF THE DRAWINGS

The attached drawings show an apparatus according to the present invention for dewatering and loosening raw biopulp.

FIG. 1 shows a side view of an apparatus in section while

FIG. 3 is a cross-sectional view of a rectangular piston 2 in a rectangular channel 3.

DETAILED DESCRIPTION OF THE PREFERRED EMBODIMENT

Figure 1:
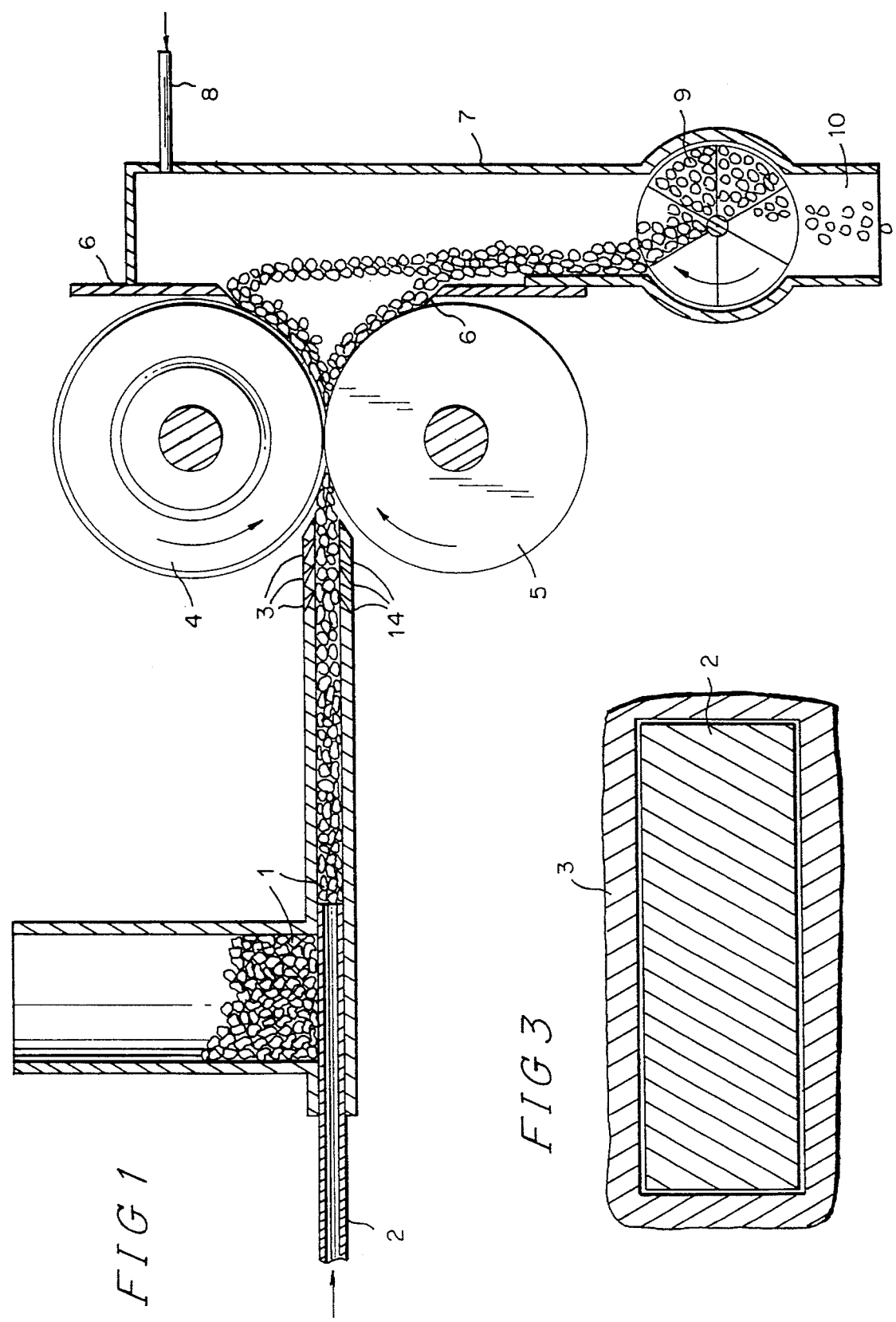

In FIG. 1 the number 1 designates precrushed wood, approximately 2–5 mm in size while 2 designates a feeder piston which presses the raw wood through a channel 3 equipped with conical draining holes 14 toward two counter-rotating press rolls 4 and 5. The rolls are profiled, where the upper roll 4 is composed of several plates in a width which corresponds to the lower solid roll's width. On the exit side of the rolls there is a sealing element with a scraper 6 which is in a backpressure vessel 7 in which there is an overpressure. This overpressure is between about 1 and 8 bars and is maintained by compressed air via a line 8. In the bottom of the backpressure vessel there is a sealed compartment feeder 9 for feeding and transport of the dewatered and loosened raw material to an outlet 10.

Figure 2:
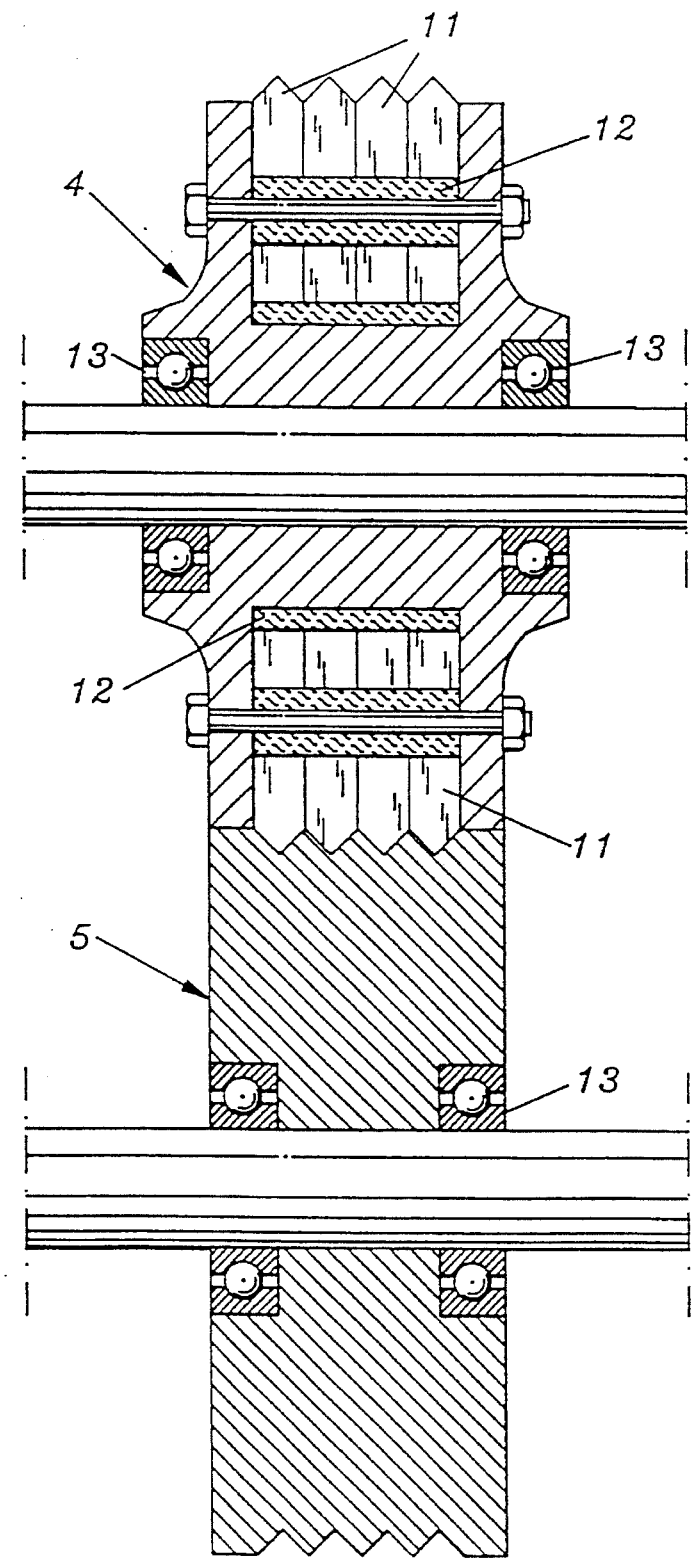
FIG. 2 shows a cross section through the upper and lower rolls of the apparatus.

In FIG. 2, which shows a section through the upper roll 4 and the lower roll 5, 11 designates radially moveable plates which are mounted elastically in an elastic element 12 while 13 designates bearings for the rolls 4 and 5. A suitable material for the elastic element 12 is a urethane based rubber such as Adiprene® from DuPont.

In the method according to the present invention the raw precrushed wood is press fed using a system of feeder pistons against two counter-rotating press rolls which produce a pressure of 500 to 1000 bars. Both these rolls are profiled and the lower roll is made of solid metal while the upper roll is constructed of a number of separate plates in a combined width equal with (or less than) the width of the solid roll. The plates are mounted elastically on an elastic element.

The channels through which the feeder pistons press the raw wood against the press rolls are perforated nearest the roll pair by draining holes for the water that has been pressed out. The holes are conical, at an acute angle with respect to the piston's direction of motion and have a diameter which increases away from the inner surface of the channels. The diameter of the holes nearest the inner surface of the channel is, of course, smaller than the smallest particle size of the precrushed wood. The overpressure that exists on the exit side of the rolls produces a strong air flow through the nip between the working rolls whereby the water pressed out is blown out through the draining holes and whereby remoistening of the wood is avoided. The overpressure is maintained using an air compressor and for maintaining the pressure it is also important that there are sealing wood scrapers and that the compartment feeder which continuously locks out the loosened raw wood is also sealed.

During the return of the feeder piston the draining holes can be purged if necessary using compressed air blown through the holes inward toward the feeder channel.

The essential purpose of the method according to the invention is to dewater and loosen the wood in preparation for subsequent chemical and/or mechanical processing. The method and apparatus according to the present invention are very advantageous when manufacturing powdered fuel from energy forests. Normally such energy forests are harvested already during the last part of the summer so that the wood can have time to dry to 50%, which normally takes about two months. Using the method according to the invention it is not necessary to harvest before the end of the growing season, but only before the wood has frozen, because the raw biopulp does not need a special drying period since it is effectively dewatered in the treatment according to the present invention. With the current roll presses which have roll pairs with solid rolls water contents lower than 45% are not obtained, partly because of remoistening. The problem of remoistening is avoided with the method and apparatus according to the present invention using the backpressure vessel in which there is an overpressure.

An essential feature of the method according to the present invention is that the raw biopulp is pressed in feeder channels against the pair of rolls by means of a system of feeder pistons. In a suitable embodiment rectangular feeder channels and feeder pistons are used. In order to obtain an even pressure distribution between the rolls the design of the dewatering rolls with the elastic mounting of the plates in one of the rolls is important. Another essential feature is, as has been emphasized above, the use of a backpressure vessel on the exit side of the pair of rolls, which contributes significantly to the dewatering of the biopulp and prevents its remoistening because air is pressed through the nip between the rolls against their rotation direction, whereby the water is forced out through the draining holes in the feeder channels in front of the pair of rolls.

According to another suitable embodiment, instead of using draining holes in the feeder channels said channels can be made of sintered metal, at least the part nearest the rolls.

The method and apparatus according to the present invention for dewatering and loosening raw biopulp through roll dewatering is of great practical importance for production of powdered fuel for furnaces and diesel engines with a particle size of up to 30 μm according to the method described in the U.S. Pat. No. 4,797,135. After dewatering and loosening precrushed wood using the method according to the present invention and drying the wood is impregnated with a diluted NaOH solution. Then it is heated at an elevated temperature for a suitable period of time. This treatment embrittles the wood and the crushing energy necessary for production of the powdered fuel is reduced significantly as compared to untreated wood. Wood pretreated according to the invention has also been shown to be more easily hydrolyzed. In addition a no little reduction of the particle size after hydrolysis and crushing has been observed.

In an alternative to the method described above the wood that has been dewatered and loosened up and dried according to the invention can be treated with formic acid steam at elevated temperature for a suitable period of time at atmospheric pressure instead of being impregnated with sodium hydroxide. For production of powdered fuel in this way the energy per kilogram powder is reduced to a small fraction of the energy needed to produce similar powder from chips which have only been dried. In a typical series of experiments this energy reduction was found to be 98%.

The method and apparatus according to the present invention for production of dewatered and loosened material can also advantageously be used for production of fillers for plastics. The dewatered and loosened biopulp is then treated with, for instance, the heated steam of an organic acid such as formic acid at atmospheric pressure in accordance with the method described in the U.S. Pat. No. 4,559,376, whereby an easily disintegrable and easily dispersible filler for plastics is obtained.

The method and apparatus according to the present invention may also be of use in production of paper pulp using chemical or chemo-mechanical pulping methods. When producing paper pulp using wood chips which have been dewatered and loosened according to the method of the present invention the treatment time can be substantially reduced.

We claim:

1. Apparatus for dewatering and loosening raw biopulp, comprising a system of feeder pistons (2) for press feeding the biopulp between two profiled parallel press rolls (4, 5) on an entrance side of the press rolls, including a solid metal first press roll (5) and a second press roll (4), in a width corresponding to that of the first press roll, the second press roll including a number of elastically mounted plates which can move radially in response to a radial load, a backpressure vessel (7) communicating with an exit side of the press rolls and having means for creating an overpressure on the exit side of the press rolls, and a compartment feeder (9) for transferring the biopulp from the backpressure vessel without loss of the overpressure therefrom.

2. The apparatus according to claim 1, wherein the system of feeder pistons includes rectangular pistons and rectangular channels for accepting the rectangular pistons therein, which channels are equipped with conical holes at an acute angle to the direction of the piston's motion for draining the dewatering water, which holes have a diameter increasing outward from an inner surface of the channel and which can be purged using compressed air from a compressed-air source when the pistons are returned to their initial positions.

3. Apparatus according to claim 1, comprising means for adjusting the overpressure in the backpressure vessel in the interval 1–8 bars overpressure.

* * * * *